(12) United States Patent
Minalga et al.

(10) Patent No.: US 6,617,737 B1
(45) Date of Patent: Sep. 9, 2003

(54) APPARATUS AND METHOD OF POWERING LIGHT SOURCE

(75) Inventors: Philip F. Minalga, Pendleton, SC (US); George Michael Hornick, Anderson, SC (US)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 10/171,457

(22) Filed: Jun. 13, 2002

(51) Int. Cl.[7] .............................. H02P 7/36; H02P 7/42
(52) U.S. Cl. ...................... 310/112; 318/716; 318/812; 318/245; 318/321; 318/530; 318/531
(58) Field of Search .................... 310/112; 318/716, 318/812, 245, 521, 531, 530

(56) References Cited

U.S. PATENT DOCUMENTS

| | | | |
|---|---|---|---|
| 3,710,062 A | * | 1/1973 | Peters .......................... 210/10 |
| RE27,893 E | | 1/1974 | Miller |
| 3,979,615 A | | 9/1976 | Neff |
| 4,153,869 A | | 5/1979 | Ragály |
| 4,322,647 A | | 3/1982 | Neroda et al. |
| 4,340,829 A | | 7/1982 | McCoy |
| 4,403,943 A | * | 9/1983 | Stella ........................... 431/31 |
| 4,481,435 A | | 11/1984 | Loforese |
| 4,585,964 A | | 4/1986 | Hildebrandt |
| 4,673,834 A | | 6/1987 | Wrobel |
| 4,926,079 A | | 5/1990 | Niemela et al. |
| 5,306,996 A | * | 4/1994 | Yang ........................... 318/716 |
| 6,380,702 B1 | * | 4/2002 | Rottmerhusen ............. 318/245 |
| 6,448,735 B1 | * | 9/2002 | Gochale ...................... 318/700 |
| 6,462,506 B2 | * | 10/2002 | Cochoy ....................... 318/801 |
| 6,504,732 B2 | * | 1/2003 | Abe .............................. 263/17 |

* cited by examiner

Primary Examiner—Thomas M. Dougherty
Assistant Examiner—Iraj A Mohandesi
(74) Attorney, Agent, or Firm—Brooks & Kushman P.C.

(57) ABSTRACT

An apparatus and method of powering a light source are provided. The apparatus includes a motor, a voltage stabilizing circuit, and a light source. The motor includes a field assembly and an armature assembly. The field assembly includes an intermediate tap on a field winding that forms a variable field winding power source. The stabilizing circuit connects to the intermediate tap and includes a voltage regulator having an output that is connected to a light source to be stabilized.

13 Claims, 3 Drawing Sheets

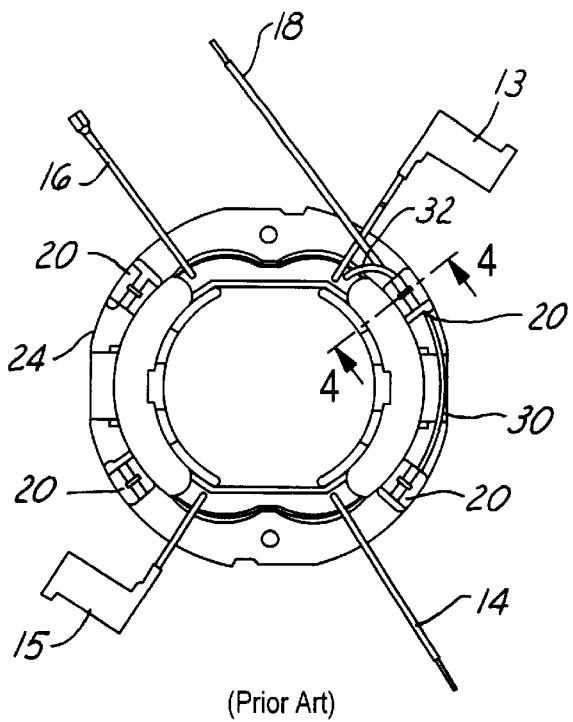
(Prior Art)
FIG. 1
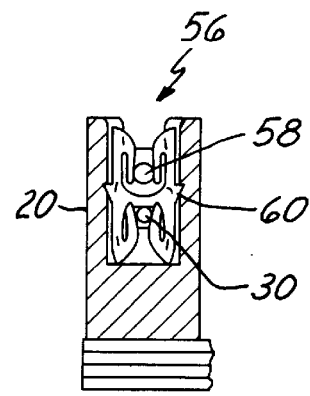
(Prior Art)
FIG. 4
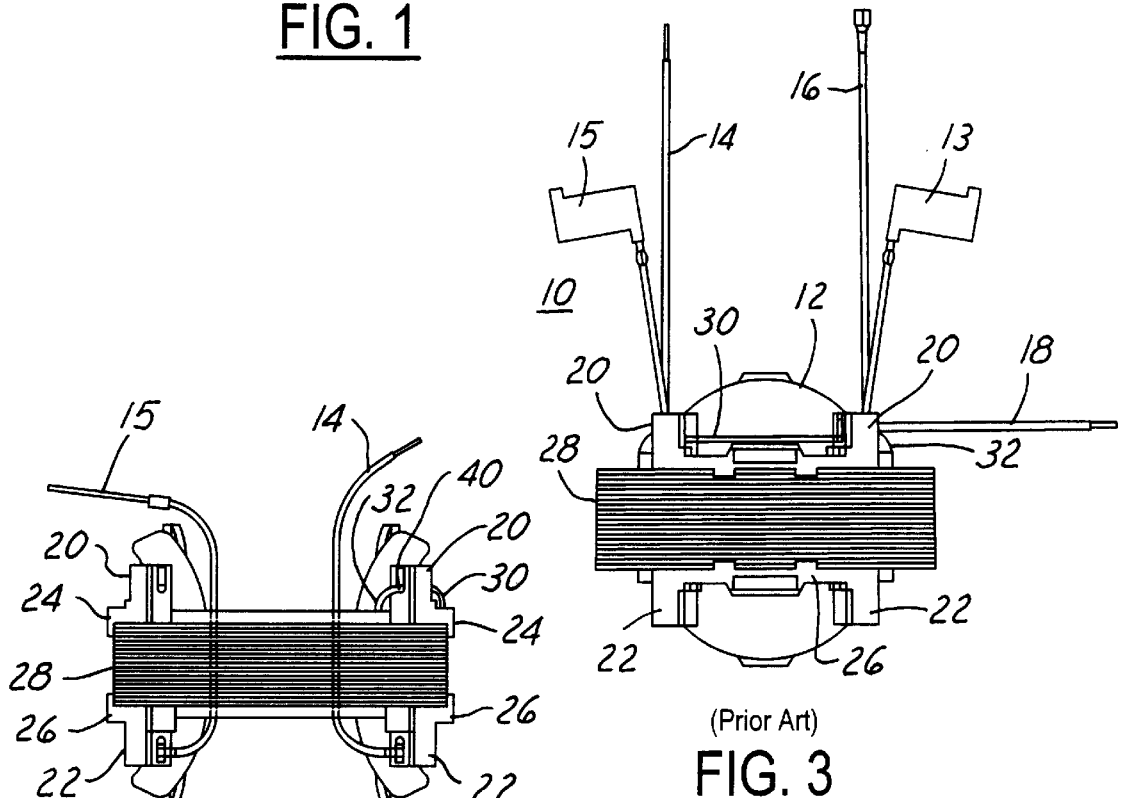
(Prior Art)
FIG. 2
(Prior Art)
FIG. 3

APPARATUS AND METHOD OF POWERING LIGHT SOURCE

BACKGROUND OF THE INVENTION

1. Field of the Invention

The present invention relates to an apparatus and method of powering a light source from an intermediate tap on a field winding of a motor.

2. Background Art

An intermediate tap for a field winding of a motor is desirable for several reasons. Such a tap may be used as a means for changing the motor speed, for example. Additionally, an intermediate tap may be used to provide an output voltage which may be used to activate a lamp or other indicator, to supply power to electronic circuitry, or the like. U.S. Pat. No. 4,926,079 describes a motor field winding with an intermediate tap.

FIGS. 1–4 illustrate an existing motor field winding with an intermediate tap. FIG. 1 shows a plan view of a field winding assembly. FIG. 2 shows a side elevation view of the field winding assembly. FIG. 3 shows a front elevation view of the field winding assembly. FIG. 4 is a section view, taken along line 4—4 of FIG. 1 showing a frictional terminal device used to contact the intermediate point of the winding.

With continuing reference to FIGS. 1–4, the existing field winding assembly is generally indicated at 10, and a pole piece structure at 12. Terminal leads 13 and 14 contact a first field winding and terminal leads 15 and 16 contact a second field winding of the assembly 10. There is an additional terminal lead 18 for contacting an intermediate point on the first field winding, that is, contacting the intermediate tap. As shown, the various terminal leads are connected to the ends and to an intermediate tap of the field windings at various pocket portions 20, 22 of a plurality of terminal boards 24, 26. The assembly 10 also includes a stack 28 of laminations. A portion 30 of the magnet wire turn including the intermediate point to be contacted is connected to the rest of the winding by an end segment 32. Contact with the intermediate point is made by a frictional terminal device 56 inserted in one of the pocket portions. In FIG. 4, terminal device 56 is shown inserted in pocket portion 20 and making contact with the intermediate point along the wire to provide the desired intermediate tap for the field winding. Terminal device 56 is generally an H-shaped device for engaging both the portion 30 of the magnet wire and a terminal lead 58. One-way barb 60 prevent device 56 from being removed from pocket portion 20. This existing motor field winding assembly with an intermediate tap and an additional alternative assembly, are described in further detail in U.S. Pat. No. 4,926,079.

The lead from the intermediate tap on the field winding, as mentioned above, may be used to provide an output voltage which may be used to activate a lamp or light. When using the tap as a power source for a light, the light intensity will vary as the voltage of the field winding varies. A field voltage may vary continuously due to line voltage variations, motor load conditions and motor speed conditions. This voltage variation will cause the intensity of light powered by this voltage to vary also. The light intensity will appear to flicker in intensity as quickly as the voltage varies.

Additional background information relating to armature and field assemblies may be found in U.S. Pat. Nos. 4,673, 834; 4,585,964; 4,481,435; 4,340,829; 4,322,647; 4,153, 869; 3,979,615 and Re. 27,893.

For the foregoing reasons, there is a need for an approved apparatus and method of powering a light source that is useable with an intermediate tap on a field winding and that avoids the flicker problem associated with the existing assemblies.

SUMMARY OF THE INVENTION

It is, therefore, an object of the present to provide an apparatus and method of powering a light source for use with a motor that utilizes a voltage stabilizing circuit connected between an intermediate tap and a light source.

In carrying out the above object, an apparatus is provided. The apparatus comprises a motor including a field assembly and an armature assembly. The field assembly includes a field winding. An intermediate tap on the field winding forms a variable field winding power source. The apparatus further comprises a voltage stabilizing circuit and a light source. The voltage stabilizing circuit is connected to the intermediate tap. The voltage stabilizing circuit includes a voltage regulator having an output. The light source is connected to the voltage regulator output.

The motor may be any motor wherein the intermediate tap of the field winding forms a variable field winding power source. The motor may be a series wound direct current motor or universal alternating current motor depending on the application.

In a preferred embodiment, the voltage stabilizing circuit further includes a bridge rectifier between the intermediate tap and the voltage regulator. Further, the voltage stabilizing circuit includes a filter capacitor between the bridge rectifier and the voltage regulator. More preferably, the light source includes a high intensity light emitting diode or series of such diodes.

Further, in carrying out the present invention, an apparatus is provided. The apparatus comprises a motor, a voltage stabilizing circuit, and a light source. The motor includes a field assembly and an armature assembly. The field assembly includes a field winding wherein an intermediate tap on the field winding forms a variable field winding power source. The voltage stabilizing circuit is connected to the intermediate tap. The voltage stabilizing circuit includes a bridge rectifier connected to the intermediate tap and a voltage regulator connected to the bridge rectifier. The voltage regulator has an output. The light source is connected to the voltage regulator output. The light source includes a high intensity light emitting diode.

Preferably, the voltage stabilizing circuit further includes a filter capacitor between the bridge rectifier and the voltage regulator. The motor may be of a variety of types such as a series wound direct current motor or universal alternating current motor.

Still further, in carrying out the present invention, a method of powering a light source for use with a motor including a field assembly and an armature assembly is provided. The field assembly includes a field winding. The method comprises forming an intermediate tap on the field winding to create a variable field winding power source. The method further comprises connecting a voltage stabilizing circuit to the intermediate tap. The voltage stabilizing circuit includes a voltage regulator having an output. The method further comprises connecting the light source to the voltage regulator output.

In a preferred embodiment, the method further comprises connecting a bridge rectifier between the intermediate tap and the voltage regulator. A filter capacitor is preferably connected between the bridge rectifier and the voltage regulator.

The advantages associated with embodiments of the present invention are numerous. In a series motor, such as a series direct current or universal alternating current motor, changes in motor load and speed cause voltage at the intermediate tap in the fielding winding to vary. The stabilizing technique of the present invention provides a fixed voltage for powering the light source.

The above object and other objects, features, and advantages of the present invention are readily apparent from the following detailed description of the preferred embodiment when taken in connection with the accompanying drawings.

BRIEF DESCRIPTION OF THE DRAWINGS

FIG. 1 shows a plan view of a field winding assembly;

FIG. 2 shows a side elevation view of the field winding assembly;

FIG. 3 shows a front elevation view of the field winding assembly;

FIG. 4 is a sectional view, taken along line 4—4 of FIG. 1, showing a frictional terminal device used to contact the intermediate point of the winding;

DETAILED DESCRIPTION OF THE PREFERRED EMBODIMENT(S)

Figure 5:
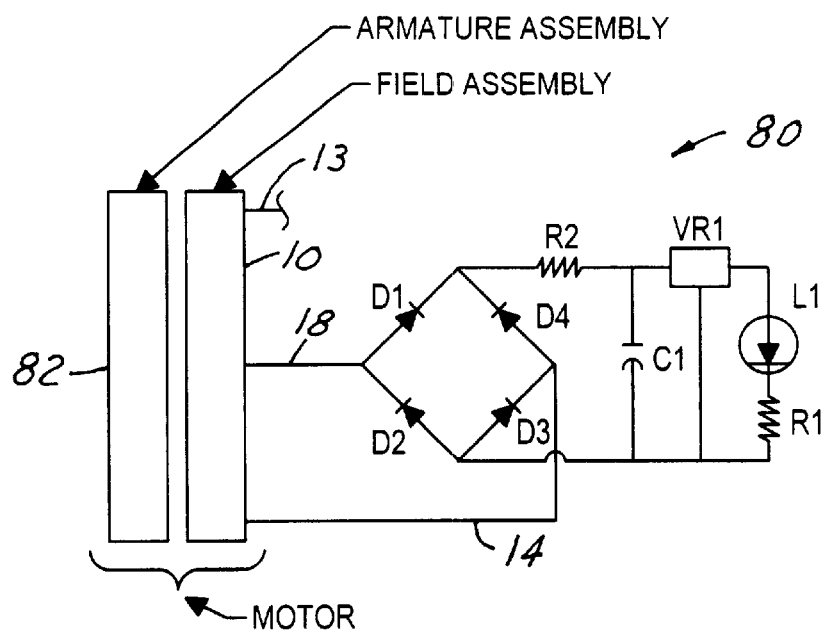
FIG. 5 is a diagram illustrating a preferred embodiment of an apparatus of the present invention.

With reference to FIG. 5, an apparatus of the present invention is schematically illustrated at 80. Apparatus 80 includes a motor that includes a field assembly 10 and an armature assembly 82. Field assembly 10 may be implemented as the field assembly shown in FIGS. 1–4. Armature assembly 82 may take any suitable form. Further, the field assembly and armature assembly that form the motor may take any suitable form and all illustrations of these assemblies shown herein are exemplary. Field assembly 10 includes a field winding wherein an intermediate tap on the field winding forms a variable field winding power source. As shown in FIG. 5, lead 18 connects to the intermediate tap.

As illustrated by the preferred embodiment in FIG. 5, a bridge rectifier shown as a full wave bridge rectifier composed of diodes D1, D2, D3, D4 is connected to the intermediate tap. Alternatively, the bridge rectifier circuit may be a half way rectifier. Following the rectifier is a capacitor C1 and associated resistor R2 which are optional. The capacitor and resistor are preferred when the motor is a universal alternating current motor, but may not be required in a series direct current motor application. Capacitor C1 filters the voltage from the bridge rectifier. The voltage regulator VR1 (or zener diode) connects to the circuit after the bridge rectifier and capacitor to stabilize the voltage at a fixed level. The fixed voltage level is then applied to light source L1, which in turn outputs a stable light intensity. Resistor R1 is shown regulating the current through light source L1 which is preferably a high intensity light emitting diode. Alternatively, a sequence of light emitting diodes may be provided in parallel or in series. The stabilized high intensity light is suitable for many applications. For example, a stabilized high intensity light may be very useful in apparatuses such as vacuum cleaners or power tools. In a vacuum cleaner application, embodiments of the present invention would allow a light on the vacuum cleaner to avoid dimming or flickering when the motor is loaded and unloaded, or line voltage varies.

Figure 6:
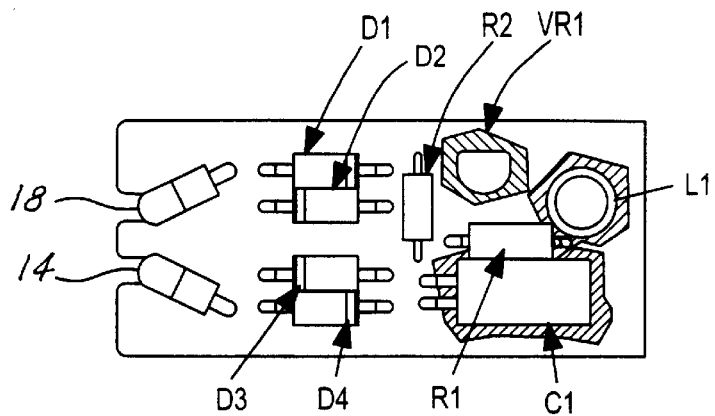
FIG. 6 is a plan view of an apparatus in a preferred embodiment of the present invention.
Figure 7:
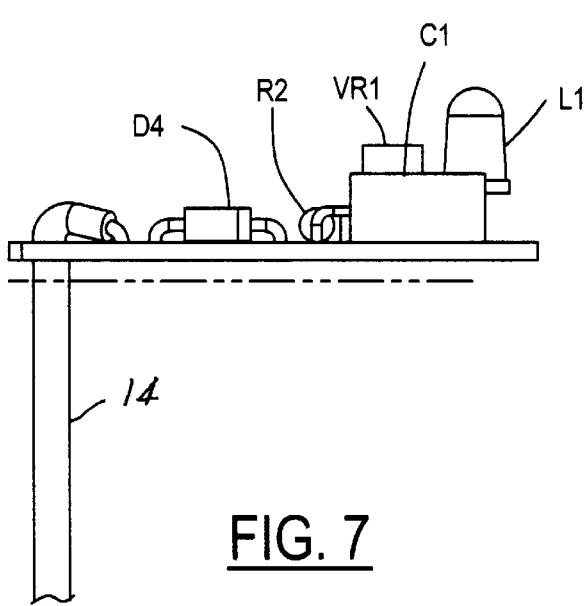
FIG. 7 is side view of an apparatus in a preferred embodiment of the present invention.
Figure 8:
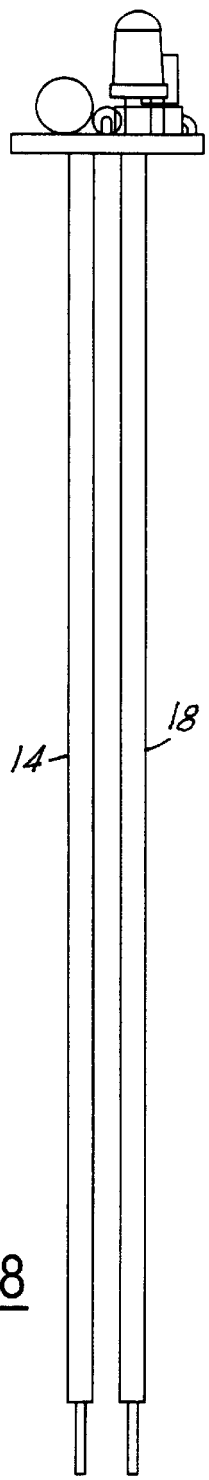
FIG. 8 is an end view of an apparatus in the preferred embodiment of the present invention.

FIG. 6–8 illustrate an exemplary construction of a circuit board 84 and the various components used to implement the voltage stabilizing circuit and light source for a preferred apparatus construction of the present invention. Leads 14 and 18 shown in FIGS. 6–8 connect to the variable field winding power source.

Figure 9:
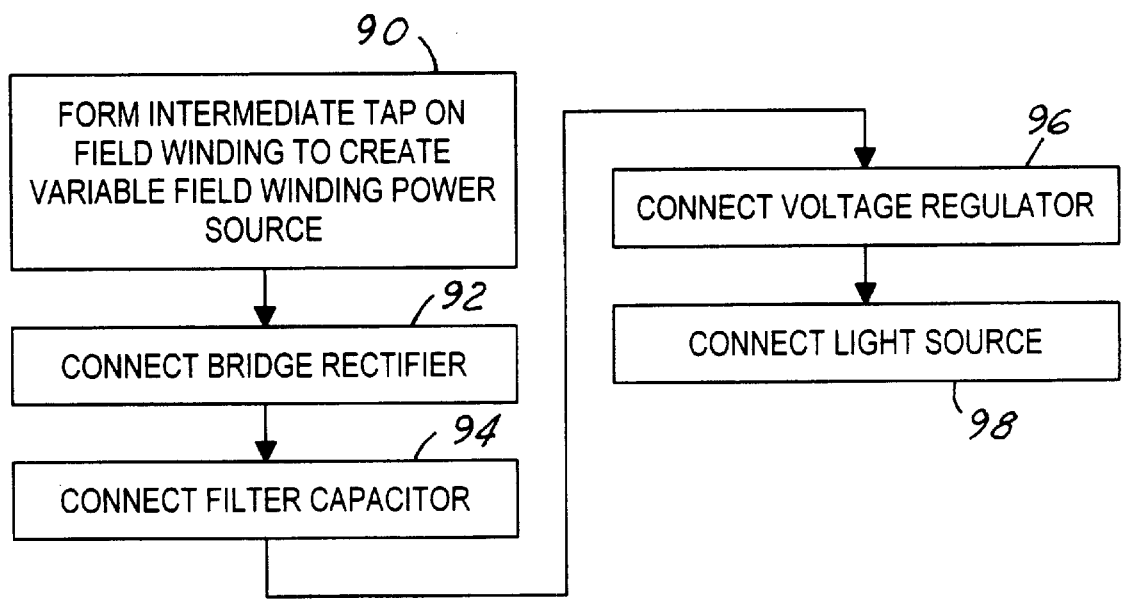
FIG. 9 illustrates a method of powering a light source in a preferred embodiment of the present invention.

FIG. 9 illustrates a method of the present invention for powering a light source in accordance with a preferred embodiment. At block 90, an intermediate tap is formed on a field winding to create a variable field winding power source. Suitable motors for creating a variable field winding power source include series wound motors such as a series direct current motor or universal alternating current motor. Of course, other motor constructions with some series aspects to the field winding may also be used in embodiments of the present invention. At block 92, a bridge rectifier is connected to the intermediate tap. A block 94, a filter capacitor is connected to the bridge rectifier. At block 96, a voltage regulator is connected to the filter capacitor. At block 98, the light source is connected which is preferably a high intensity light emitting diode or a sequence of high intensity light emitting diodes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus comprising:
   a motor including a field assembly and an armature assembly, the field assembly including a field winding wherein an intermediate tap on the field winding forms a variable field winding power source;
   a voltage stabilizing circuit connected to the intermediate tap, the voltage stabilizing circuit including a voltage regulator having an output; and
   a light source connected to the voltage regulator output.

2. The apparatus of claim 1 wherein the motor is a series wound direct current motor.

3. The apparatus of claim 1 wherein the motor is a universal alternating current motor.

4. The apparatus of claim 1 wherein the voltage stabilizing circuit further includes a bridge rectifier between the intermediate tap and the voltage regulator.

5. The apparatus of claim 4 wherein the voltage stabilizing circuit further includes a filter capacitor between the bridge rectifier and the voltage regulator.

6. The apparatus of claim 1 wherein the light source includes a high intensity light emitting diode.

7. An apparatus comprising:
   a motor including a field assembly and an armature assembly, the field assembly including a field winding wherein an intermediate tap on the field winding forms a variable field winding power source;
   a voltage stabilizing circuit connected to the intermediate tap, the voltage stabilizing circuit including a bridge rectifier connected to the intermediate tap and a voltage regulator connected to the bride rectifier, the voltage regulator having an output; and a light source connected to the voltage regulator output, the light source including a high intensity light emitting diode.

8. The apparatus of claim 7 wherein the voltage stabilizing circuit further includes a filter capacitor between the bridge rectifier and the voltage regulator.

9. The apparatus of claim 1 wherein the motor is a series wound direct current motor.

10. The apparatus of claim 1 wherein the motor is a universal alternating current motor.

11. An method of powering a light source for use with a motor including a field assembly and an armature assembly, the field assembly including a field winding, the method comprising:

forming an intermediate tap on the field winding to create a variable field winding power source;

connecting a voltage stabilizing circuit to the intermediate tap, the voltage stabilizing circuit including a voltage regulator having an output; and connecting the light source to the voltage regulator output.

12. The method of claim 11 further comprising:

connecting a bridge rectifier between the intermediate tap and the voltage regulator.

13. The method of claim 12 further comprising:

connecting a filter capacitor between the bridge rectifier and the voltage regulator.

* * * * *